Jan. 4, 1955

R. L. EDWARDS 2,698,604

LUBRICATING SYSTEM FOR PNEUMATIC MOTORS

Filed May 19, 1954

INVENTOR.
ROBERT L. EDWARDS
BY
Barnes, Kisselle, Laughlin & Raisch
ATTORNEYS.

United States Patent Office 2,698,604
Patented Jan. 4, 1955

2,698,604

LUBRICATING SYSTEM FOR PNEUMATIC MOTORS

Robert L. Edwards, Detroit, Mich., assignor to Master Pneumatic Supply Co., Detroit, Mich., a corporation of Michigan Application May 19, 1954, Serial No. 430,761

11 Claims. (Cl. 121—38)

This invention relates to a lubricating system for a pneumatically operated device connected to a pneumatic pressure line.

An exemplary application of the invention lies in lubricating a pneumatic motor having an air cylinder with a piston reciprocable therein for actuating a tool such as a spot welding gun. The motor may be used for any purpose. Compressed air is supplied to the cylinder through a conduit. A dispenser upstream of the motor delivers lubricant to air flowing through the conduit and supposedly the air propels or moves the lubricant to the motor. However, systems now in use supply the compressed air to the cylinder and exhaust the air therefrom through the same conduit so that it is possible for the lubricant merely to oscillate back and forth in the line, resulting in inadequate or no lubrication for the motor. This situation is aggravated where, as frequently occurs, the motor is at the end of a pneumatic line and at a considerable distance from the lubricator. Moreover, when pressure in the conduit is relieved by releasing the compressed air to the atmosphere upstream of the lubricator in the usual manner, it frequently carries a load of lubricant which permeates the atmosphere, thereby wasting lubricant, soiling nearby surfaces and creating a fire hazard.

It is an object of this invention to provide a simple inexpensive system which has positive means for lubricating a pneumatic motor and which is clean, economical and safe in its operation. The invention is carried out generally by providing separate conduits on the motor for the supplying and exhausting of compressed air with valve means in the conduits causing the lubricant-propelling air to enter the motor before being exhausted from the system. In the drawings.

Figure 1:
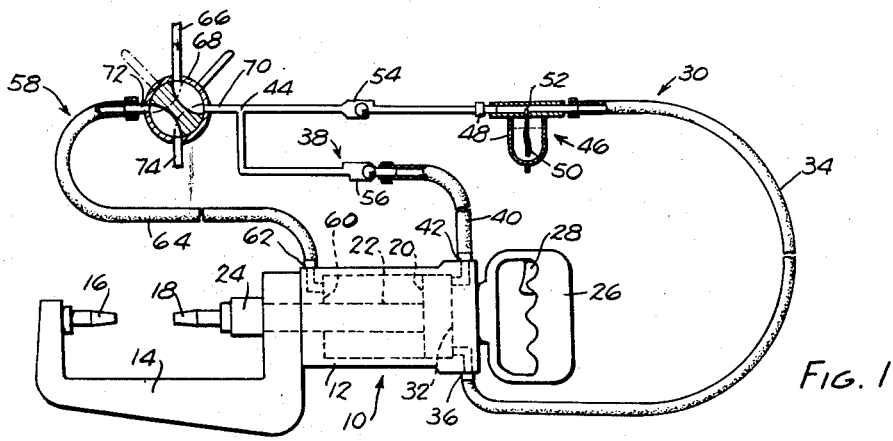
Fig. 1 is a largely diagrammatic view of the device of this invention as applied to a spot welding gun.

Shown in Fig. 1 is a spot welding gun 10 having a frame which includes a pneumatic cylinder 12 and a support 14 for electrodes 16 and 18. A piston 20 is pneumatically reciprocable within the cylinder and a piston rod 22 thereon has a chuck 24 at its outer end for holding electrode 18. Secured on the frame is a handle 26 which includes an operating trigger 28 for the gun.

A pneumatic conduit 30 is connected into one end 32 of cylinder 12 preferably through a flexible hose portion 34 connected to a fitting 36 on the cylinder. Another conduit 38 is connected into the same end of the cylinder preferably through flexible hose portion 40 and fitting 42 as shown. Conduits 30 and 38 are in communication as indicated at 44 so that they, together with end 32 of the cylinder, form a closed circuit.

Included in conduit 30 is a lubricating device 46 for delivering lubricant to air flowing through the conduit. Lubricator 46 may include a cup 48 serving as a reservoir for lubricant with wick means 50 having one end immersed in the lubricant and its other end 52 projecting into the interior of the conduit as shown. Conduit 30 has a check valve 54 arranged to permit flow of air from the lubricator only toward fitting 36 in end 32 of the cylinder. Conduit 38 has a check valve 56 permitting flow of air only away from fitting 42.

A third conduit 58 is connected into end 60 of cylinder 12 opposite from end 32 through fitting 62 and this conduit preferably includes a flexible hose 64.

Compressed air is furnished to the system of conduits through a supply line 66 connected to a suitable source of compressed air, not shown, and through a four-way valve 68 connected to the conduits as at 70 and 72. The fourth side of valve 68 is connected to an exhaust line 74. Valve 68 is operated by trigger 28 through suitable means, not shown.

As to operation of the device, it may be assumed that the gun 10 is initially in the inoperative position shown in Fig. 1 with valve 68 in the dotted line position so that the pressure in conduits 30 and 38 is relieved and the pressure in conduit 58 and end 60 of the cylinder holds piston 20 and movable electrode 18 in retracted position.

When work pieces have been inserted between the electrodes, trigger 28 is depressed to shift valve 68 to the solid line position, thereby introducing air pressure into conduits 30 and 38 and exhausting the air from end 60 of the cylinder through conduit 58 and exhaust line 74. Piston 20 is forced toward end 60 of the cylinder, thereby closing the electrodes into contact with the work pieces. The influx of air into the conduits 30 and 38 closes check valve 56 and opens check valve 54 so that the compressed air is furnished to end 32 of the cylinder only through conduit 30 and the air passing therethrough picks up lubricant from end 52 of wick 50 and deposits it on the interior wall of the cylinder 12 to provide a lubricated surface for contact with piston 20. The system thus provides positive means for lubricating the interior of the cylinder.

When the welding has been completed, trigger 28 is released to return valve 68 to its dotted line position. Pressure is again introduced into end 60 of the cylinder through conduit 58 and the pressure in conduits 30 and 38 is relieved so that piston 20 carries electrode 18 to retracted position. The efflux of air from conduits 30 and 38 closes check valve 54 and opens check valve 56 so that air exhausts from cylinder 12 only through conduit 38 and none of the lubricant-propelling air in conduit 30 is permitted to exhaust until after it has passed through cylinder 12, there to deposit its charge of lubricant. To repeat the process, new work pieces are inserted between the electrodes and trigger 28 is again depressed and released.

Figure 2:
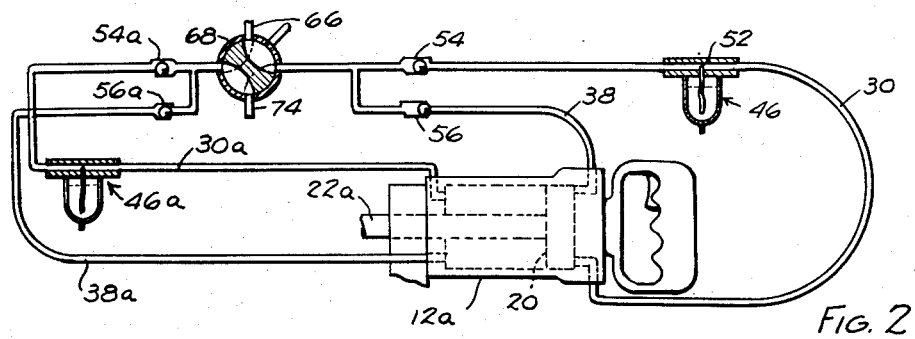
Fig. 2 is similar to Fig. 1 but showing a modified form of the invention in a device adapted for general use.
Figure 3:
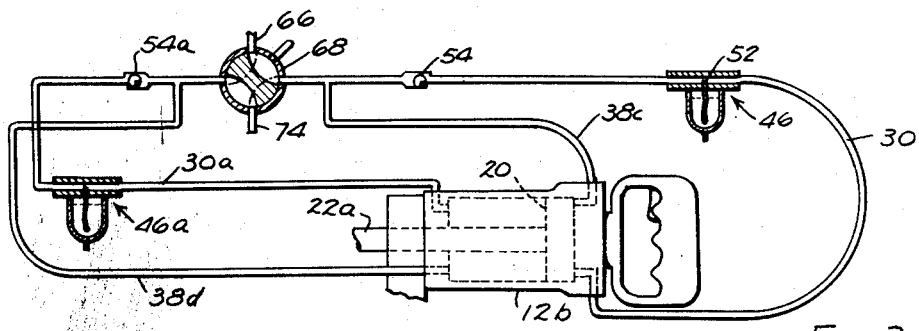
Fig. 3 is similar to Fig. 2 but showing a second modification of the invention.
Figure 4:
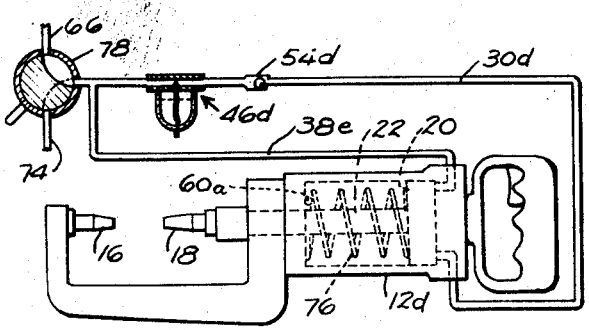
Fig. 4 is similar to Fig. 1 but showing a third modified form of the invention.

Modified forms of the invention are illustrated in Figs. 2–4 with identical parts indicated by like reference characters and with the conduits represented entirely diagrammatically. The modification shown in Fig. 2 is similar to the form shown in Fig. 1 except that the device is adapted for general use and both ends of cylinder 12a are lubricated by a lubricating circuit. One circuit includes conduits 30 and 38 and the other circuit includes conduits 30a and 38a, a lubricator 46a and check valves 54a and 56a. Cylinder 12a is thus lubricated during both the work stroke and retracting stroke of piston 20 rather than in the work stroke alone as in the Fig. 1 form of the invention. Any desired tool may be connected to piston rod 22a.

The modification shown in Fig. 3 is similar to the Fig. 2 form, being adapted for general use and having lubricating circuits for both ends of the cylinder 12b. In this form of the invention the conduits 38c and 38d are unobstructed. Thus introduced compressed air may pass into one end of the cylinder through the lubricating line 30 and the open line 38c, and may pass into the other end of the cylinder through lubricating line 30a and the open line 38d. However, upon the discharge of air from one end of the cylinder, it may flow only to the open line 38c and upon discharge from the other end of the cylinder, it may flow only through the open line 38d. In the normal operation of this form of the invention, lubricant picked up by the air passing toward the cylinder through line 30 and through line 30a may only be advanced a short distance from the lubricator. But upon continued operation, the lubricant is advanced toward the cylinder in increments, cannot be caused to back up or reverse its direction in lines 30 and 30a, and therefore eventually reaches and passes into the cylinder. Any desired tool may be connected to piston rod 22a.

The modification shown in Fig. 4 is similar to the

Fig. 1 form except that piston 20 is retracted by a coil spring 76 compressed between the piston and end 60a of the cylinder 12d. The operating valve 78 has only an on position and an exhaust position as shown. In this form of the invention lubricant is conducted to only one end of the cylinder and this may be done by any one of the forms shown in Figs. 1, 2 and 3. The system shown in Fig. 4 is the same as that employed to lubricate one end of the cylinder shown in Fig. 3. The line 30d is equipped with a lubricator 46d, a check valve 54d, while the line 38e is open or unobstructed. Some air which passes to the cylinder 12d passes through line 30d picking up lubricant while some air passes to the cylinder 38e, but all exhaust air passes out through line 38e so that such air as does pass toward the cylinder through line 30d does not have any reverse motion. When the valve 78 is shifted to the dotted line position, the air is discharged through the line 38e and the spring returns the piston.

I claim:

1. An apparatus for operating and lubricating a pneumatic motor having a body with a chamber therein and an element movable relative to the body comprising, control valve means adapted to be connected to a source of air under pressure, a first conduit connecting the valve means and the chamber of the body, a second conduit connecting the valve means and said chamber of the body, a lubricator in the first conduit for supplying lubricant to air as the air passes through the conduit, the valve means being operable to connect the said chamber to the source of air under pressure and to connect the said chamber to exhaust for operation of the motor, and a check valve in the first conduit for passing air only from the valve means to said chamber.

2. An apparatus for operating and lubricating a pneumatic motor having a body with a chamber therein and an element movable relative to the body comprising, control valve means adapted to be connected to a source of air under pressure, a first conduit connecting the valve means and the chamber of the body, a second conduit connecting the valve means and said chamber of the body, a lubricator in the first conduit for supplying lubricant to air as the air passes through the conduit, the valve means being operable to connect the said chamber to the source of air under pressure and to connect the said chamber to exhaust for operation of the motor, a check valve in the first conduit for passing air only from the valve means to said chamber, and a check valve in the second conduit for passing air only from said chamber to the valve means.

3. An apparatus for operating and lubricating a pneumatic motor having a body with a chamber therein and an element movable relative to the body comprising, control valve means adapted to be connected to a source of air under pressure, a first conduit connecting the valve means and the chamber of the body, a second conduit connecting the valve means and said chamber of the body, a lubricator in the first conduit for supplying lubricant to air as the air passes through the conduit, the valve means being operable to connect the said chamber to the source of air under pressure and to connect the said chamber to exhaust for operation of the motor, and a check valve in the first conduit for passing air only from the valve means to said chamber, the second conduit being unobstructed for the passage of air therethrough in both directions.

4. An apparatus for operating and lubricating a pneumatic motor having a body with a chamber therein and an element movable relative to the body comprising, a control valve adapted to be connected to a source of air under pressure, a first conduit connecting the control valve and said chamber, a second conduit connecting the control valve to said chamber, said conduits being arranged in parallel and having a common connection to the control valve, a lubricator in the first conduit for supplying lubricant to air as the air passes through the conduit, the control valve being operable to connect both the first and second conduits to the source of air under pressure and to connect both the first and second conduits to exhaust for operation of the motor, and a check valve in the first conduit for passing air only from the control valve to said chamber.

5. An apparatus for operating and lubricating a pneumatic motor having a body with a chamber therein and an element movable relative to the body comprising, a control valve adapted to be connected to a source of air under pressure, a first conduit connecting the control valve and said chamber, a second conduit connecting the control valve to said chamber, said conduits being arranged in parallel and having a common connection to the control valve, a lubricator in the first conduit for supplying lubricant to air as the air passes through the conduit, the control valve being operable to connect both the first and second conduits to the source of air under pressure and to connect both the first and second conduits to exhaust for operation of the motor, a check valve in the first conduit for passing air only from the control valve to said chamber and a check valve in the second conduit for passing air only from said chamber to exhaust.

6. An apparatus for operating and lubricating a pneumatic motor having a body with a chamber therein and an element movable relative to the body comprising, a control valve adapted to be connected to a source of air under pressure, a first conduit connecting the control valve and said chamber, a second conduit connecting the control valve to said chamber, said conduits being arranged in parallel and having a common connection to the control valve, a lubricator in the first conduit for supplying lubricant to air as the air passes through the conduit, the control valve being operable to connect both the first and second conduits to the source of air under pressure and to connect both the first and second conduits to exhaust for operation of the motor, and a check valve in the first conduit for passing air only from the control valve to said chamber, the second conduit being unobstructed for the passage of air therethrough from the control valve to the chamber and from the chamber to the control valve.

7. In combination, a pneumatic motor having a body with a chamber therein and a relatively movable element in the chamber, a control valve adapted to be connected to a source of air under pressure, a first conduit connecting the control valve with said chamber, a second conduit connecting the control valve with said chamber, a lubricator in the first conduit for supplying lubricant to air as air passes through the conduit, the control valve being operable to connect the chamber to the source of air under pressure and to exhaust for operation of the motor, and a check valve in the first conduit for passing air only with a direction of flow from the control valve to said chamber.

8. In combination, a pneumatic motor having a body with a chamber therein and a relatively movable element in the chamber, a control valve adapted to be connected to a source of air under pressure, a first conduit connecting the control valve with said chamber, a second conduit connecting the control valve with said chamber, a lubricator in the first conduit for supplying lubricant to air as air passes through the conduit, the control valve being operable to connect the chamber to the source of air under pressure and to exhaust for operation of the motor, a check valve in the first conduit for passing air only with a direction of flow from the control valve to said chamber, and a check valve in the second conduit for passing air only with a direction of flow from said chamber to the control valve.

9. In a combination, a pneumatic motor having a body with a chamber therein and a relatively movable element in the chamber, a control valve adapted to be connected to a source of air under pressure, a first conduit connecting the control valve with said chamber, a second conduit connecting the control valve with said chamber, a lubricator in the first conduit for supplying lubricant to air as air passes through the conduit, the control valve being operable to connect the chamber to the source of air under pressure and to exhaust for operation of the motor, and a check valve in the first conduit for passing air only with a direction of flow from the control valve to said chamber, the second conduit being permanently unobstructed for the passage of air therethrough in both directions.

10. The combination as recited in claim 7 characterized in that the first and second conduits have a common connection with the control valve.

11. The combination as recited in claim 7 characterized in that the body of the pneumatic motor is a cylinder and the movable element is a piston and further characterized in that both the first and second conduits connect into one end of the cylinder.

No references cited.